Oct. 29, 1935.   H. ENDRES   2,018,779
FLUID REACTION PROPELLING APPARATUS
Filed Aug. 13, 1934   3 Sheets-Sheet 1
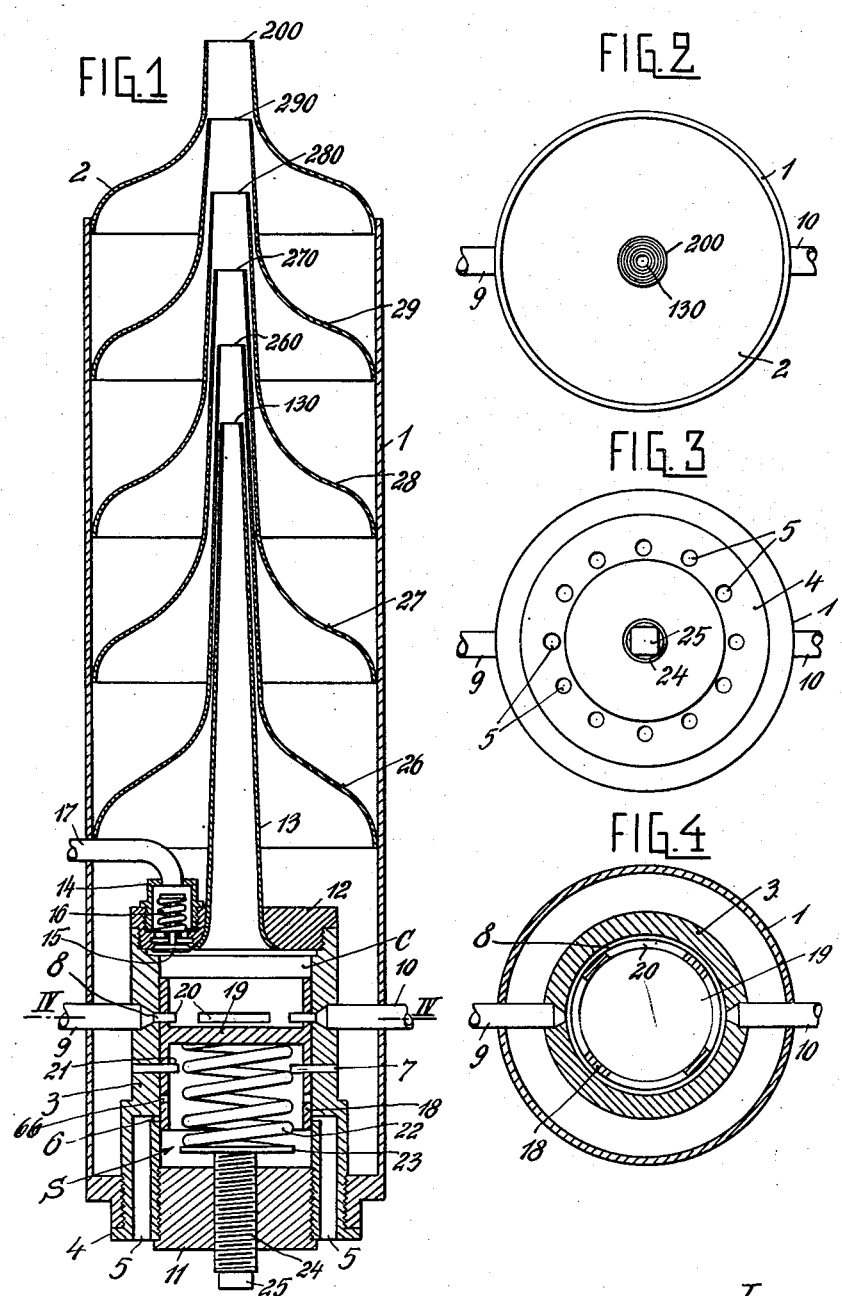
Inventor:
HANS ENDRES
By Emil Bönnelycke
ATTORNEY

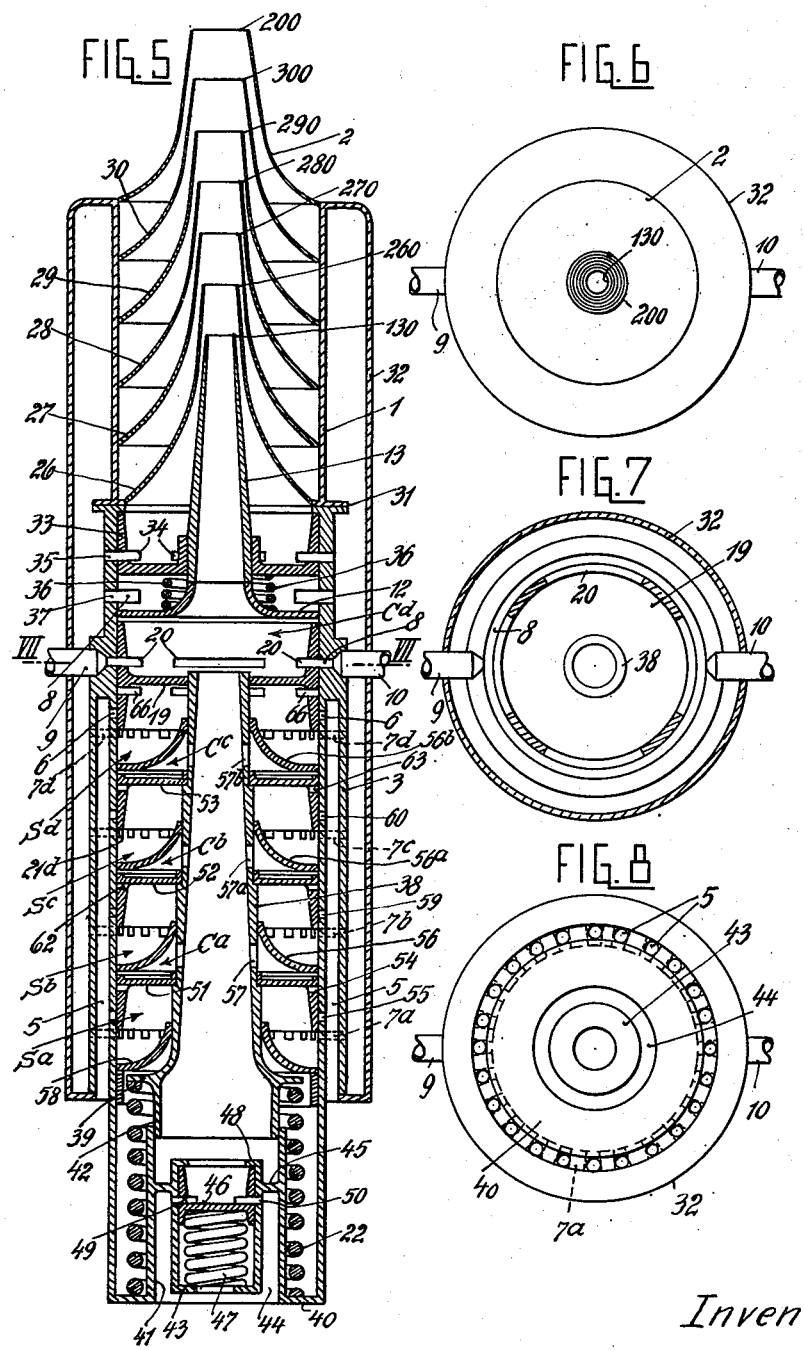

Oct. 29, 1935.  H. ENDRES  2,018,779
FLUID REACTION PROPELLING APPARATUS
Filed Aug. 13, 1934   3 Sheets-Sheet 3
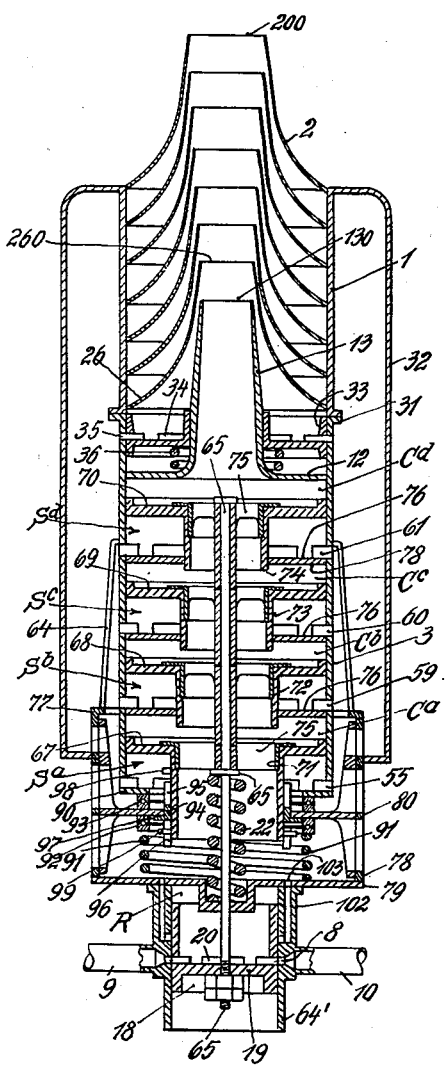
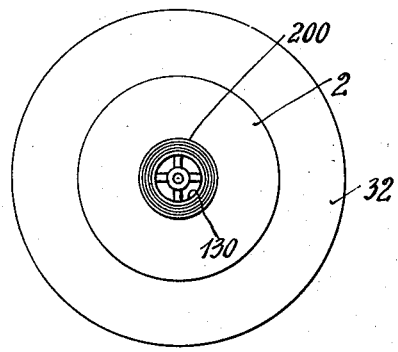
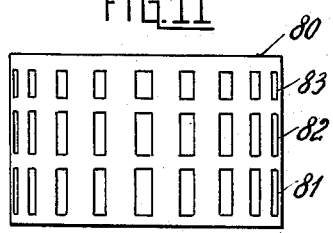
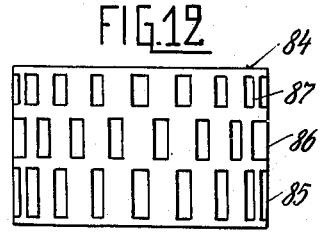
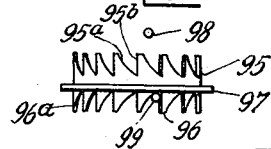
Inventor:
HANS ENDRES
By Emil Bönnelycke
ATTORNEY Patented Oct. 29, 1935

2,018,779

UNITED STATES PATENT OFFICE 2,018,779

FLUID-REACTION PROPELLING APPARATUS

Hans Endres, Solingen, Germany, assignor of one-half to Emanuel Bachmann, Los Angeles, Calif.

Application August 13, 1934, Serial No. 739,705
In Germany August 15, 1933

16 Claims. (Cl. 244—18)

My invention relates to fluid-reaction propelling apparatus.

It is an object of my invention to provide an apparatus of the kind described which may be used for vehicles on roads, for ships, or for power-generating plants of any kind, but is particularly useful in the propulsion of aircraft.

The efficiency of the usual helical propellers for aircraft is very poor, and the speed they impart is comparatively low. Fluid-reaction propelling apparatus as designed heretofore, i. e., with a single nozzle for ejecting a stream of compressed air, might be used for the propulsion of aircraft but their demand of compressed air is so high that the power input is almost equal to that of a helical propeller. This is due to the fact that only about 5% of the kinetic energy in the stream of compressed air is utilized for propulsion, and about 95% is lost. Apart from its low efficiency, the fluid-reaction apparatus is preferable to the helical propeller on account of its simplicity. It does not require an elaborate power plant, with internal-combustion engines, reduction gears, etc., and does away with all the difficulties and risks of such a plant.

It is the principal object of my invention to so design a fluid-reaction propelling apparatus that its efficiency is far superior to that of the single-nozzle apparatus referred to, as well as to the efficiency of the helical propeller while at the same time my novel apparatus is almost as simple as the one with the single nozzle.

To this end, I provide a jet, means for discharging a stream of fluid under pressure, normally compressed air, from the jet, a nozzle surrounding the outlet opening of the jet for conducting the stream into the open air, so that the stream produces a partial vacuum in the nozzle, and means controlled by the vacuum for producing the stream from the jet.

It is to be understood that in the following description the terms "front" and "rear", and corresponding expressions, relate to the direction in which the stream issues from the nozzle, i. e., this nozzle is at the rear end of the apparatus, and the jet from which the stream is primarily discharged, is in front of the nozzle.

Preferably, I provide a set of subsidiary nozzles between the nozzle at the rear end, or last nozzle, and the jet. The outlet pipes of the nozzles are arranged co-axially with respect to the jet, and to each other, and are so nested one within the other that the vacuum gradually increases and becomes a maximum in the first subsidiary nozzle. The areas of the annular clearances defined by the outlet pipe of the first subsidiary nozzle, and the outlet end of the jet, and by each pair of nested outlet pipes, increase progressively toward the rear of the apparatus, as required by the expansion of the streaming fluid.

I provide a compressor at or near the front end of the apparatus, and a piston which subdivides the compressor into a compression and a suction chamber. The jet is connected to the compression chamber, and the nozzle—or the first subsidiary nozzle, is connected to the suction chamber of the compressor. The piston is reciprocated by the difference of the pressures acting on opposite sides thereof, and controlled by means such as ports in its skirt, and corresponding ports in the wall of its cylinder.

My invention will be more fully understood from the following detailed description and the drawings in which three types of apparatus embodying my invention are illustrated by way of example.

In the drawings

Fig. 1 is an axial section,

Fig. 2 is a rear-end elevation,

Fig. 3 is a front-end elevation, and

Fig. 4 is a section on the line IV—IV in Fig. 1; showing the first and simplest type in which a single compressor piston is provided and a supply of compressed fluid, normally air, is controlled by the compressor piston;

Fig. 5 is an axial section,

Fig. 6 is a rear-end elevation,

Fig. 7 is a section on the line VII—VII in Fig. 1, and

Fig. 8 is a front-end elevation; showing the second type in which the compressor piston is subdivided into a principal piston and a set of auxiliary pistons, all on a tubular piston rod, and the principal piston controls the supply of driving fluid, Fig. 9 is an axial section, and Fig. 10 is a rear-end elevation; showing the third type in which the compressor piston is subdivided, as in the second type, but the principal and auxiliary pistons are on a solid piston rod, and a separate piston is placed on the rod for controlling the supply of driving fluid, Fig. 11 is an elevation of a ported sleeve on the compressor cylinder, Fig. 12 is an elevation of a ported rotary valve for controlling the ports in the sleeve, and Fig. 13 is an elevation of a cam for controlling the rotary valve, of the third type.

Referring now to the drawings, and first to

Figs. 1 to 4, the parts of the apparatus are housed in a casing 1 whose rear end supports the last nozzle 2, with its outlet pipe 200. A compressor cylinder 3 whose outside diameter is smaller than the inside diameter of casing 1, is screwed into the front end of the casing on whose edge it bears with a flange 4. 5 are bores in the wall of cylinder 3 which, as shown in Fig. 4, are arranged on a circle about the axis of the cylinder, and are open to the atmosphere, or to the relative wind in the case of aircraft, at their outer ends while their inner ends are connected to a row of ports 6 in the wall of cylinder 3. Another row of ports arranged at the rear of ports 6, connects the interior of the compressor cylinder 3 to the annular space it defines within the casing 1. Arranged still further to the rear is an annular groove 8 in the piston-swept inner surface of the cylinder, and 9 and 10 are pipes for supplying fluid driving medium, normally air under pressure, to the groove 8 from a suitable source, not shown. A plug 11 closes the compressor cylinder 3 at its front end, and a cover 12 is placed on its rear end. Inserted in this rear end is the base of a tapered jet 13, whose outlet end 130 extends to the rear. A casing 14 is also inserted in the cover 12 and supports a check valve 15 which opens into the cylinder 3, and spring 16 serves for seating the valve. A pipe 17 which extends through the wall of casing 1, is connected to the valve casing 14 at its inner end while its outer end opens into the atmosphere. The check valve 15 serves for admitting make-up air to the cylinder, as will be described.

Mounted to slide in the compressor cylinder 3 is a tubular piston 18 with a web 19 which subdivides the cylinder 3 into a compression chamber C at the rear, and into a suction chamber S at the front end of the cylinder. Rows of ports 66, 21 and 20 are formed in the skirt of the piston 18 for controlling, respectively, the rows of ports 6 and 7, and the groove 8. It will appear that ports 66 and 21 are in the suction, and ports 20 are in the compression chamber.

A spring 22 is placed in the suction chamber S within the tubular front portion of piston 18 upon whose web 19 its rear end bears. The front end of the spring is supported by a spring plate 23 at the inner end of a spindle 24 which is inserted in a female thread of plug 11 with its threaded portion, and equipped with a square portion 25 at its outer end for turning it and adjusting the tension of spring 22.

A set of subsidiary nozzles 26, with outlet pipe 260; 27, with outlet pipe 270; 28, with outlet pipe 280; and 29, with outlet pipe 290; is inserted in the casing 1 between the jet 13 and the last nozzle 2. The outlet pipes of the nozzles are tapered and nested as shown, and their free sectional areas increase from the front toward the rear, the area of the outlet pipe 200 of the last nozzle 2 being largest. In the same proportion, the annular spaces defined by two nested outlet pipes, increase toward the rear. The ratio at which the free sectional area of the nozzles increases, and the number of subsidiary nozzles provided, is determined by the degree of expansion of the stream from jet 13. The bodies of the last nozzle 2 and of the subsidiary nozzles 26 to 29 are funnel shaped with curved walls, and their largest diameter is equal to the inside diameter of casing 1. The volume of the compartments defined by two adjacent nozzles is a function of the ratio of the free sectional areas of their nested outlet pipes.

It will appear that the outlet pipe 260 of the first subsidiary nozzle 26 surrounds the end 130 of the jet 13, the rear end 260 of the outlet pipe projecting beyond the rear end 230 of the jet. The outlet pipe 270 of the second subsidiary nozzle 27 is in a similar position with respect to the outlet pipe 260 of the first one, and so on.

The compartments defined by the individual nozzles are not connected to the atmosphere directly but only through the outlet pipe 200 of the last nozzle 2.

The operation of my apparatus is as follows:

In the initial position of parts, as shown in Fig. 1, the spring 22 is fully expanded and the piston 18 is at the rear end of its stroke toward the compression chamber C. Its skirt lays open the ports 7 and the groove 8 but closes the ports 66. The check valve 15 in the rear cylinder cover 12 is closed by its spring 16.

For starting the apparatus, fluid under pressure, normally compressed air, is admitted to groove 8 through pipes 9 and 10. The air is admitted to the compression chamber C through the ports 20 in the skirt of the piston 18, produces a certain pressure in the chamber C and flows out through jet 13, its pressure being transformed into velocity. The primary stream from jet 13 produces reaction and, through the nested outlet pipes 260, etc., accelerates the air in the compartments defined by the nozzles of the set, producing secondary flows. The partial vacuum produced by the primary stream from jet 13 is a maximum in the first nozzle 26. This vacuum which, due to the cooperation of the several nozzles, may be lowered almost to an absolute vacuum, gets to the ports 7 in the cylinder 3, and, through ports 21 in the piston skirt, into the suction chamber S. The reduction of pressure in suction chamber S, and the higher pressure in chamber C, cooperate to throw the piston 18 as far as the front end of its stroke, compressing spring 22, closing ports 7 and groove 8, and opening ports 6. Air, or relative wind, now enters the suction chamber S through bores 5, ports 6 and 66, and atmospheric pressure—or the pressure of the relative wind—is established in suction chamber S. Spring 22 which had been compressed by the reduction of the pressure in suction chamber S, is now free to expand, and throws the piston 18 back to the rear end of its stroke, compressing the air in compression chamber C and ejecting it through jet 13, until the piston 18 has returned into its initial position and the apparatus is ready for the next cycle. The groove 8 in the compressor cylinder again registers with the ports 20 in the piston, as shown in Fig. 1, and a fresh supply of compressed air is admitted. Air for making up the volume required for producing the stream from jet 13 is drawn into the compression chamber C through check valve 15 when the piston moves in forward direction. The free sectional area of the check valve is overdimensioned to avoid return flow of air. The apparatus now keeps going until the supply of compressed air is cut off. When this occurs the apparatus does not stop immediately but continues its operation for some time until the vacuum has become exhausted.

The theory of the apparatus will now be explained. In addition to the intermittent flow of driving fluid from pipes 9 and 10 under the control of the piston, through the ports 20 in its skirt, three more intermittent flows of air are established in the apparatus as follows:

1. Drawing in make-up air through valve 15. This air which may be under the pressure of relative wind, is compressed in chamber C and discharged intermittently from jet 13 as the primary stream after the supply of driving fluid through parts 20 has been cut off.

2. Access of the partial vacuum produced by the primary stream to suction chamber S and outflow of the air from such chamber.

3. Admission of relative wind to suction chamber S through bores 5.

The apparatus may be defined as a hollow member which is not accessible to atmospheric air directly. During the compression stroke of piston 18, air is expelled from the apparatus by the stream from jet 13 issuing through the outlet pipe 200 of the last nozzle 2. During the make-up stroke of the piston, i. e., during its movement to the forward end of its stroke, the stream from pipe 200 is interrupted and an indirect connection of the subsidiary nozzles to atmosphere is established but, due to the overdimensioning of check valve 15, there is no return flow of air through outlet pipe 200 and the set of nozzles.

The kinetic energy of the stream from jet 13 is transformed into reduction of pressure in the nozzles. The partial vacuum thus produced is transferred to suction chamber S, causing the pressure in compression chamber C to compress spring 22. When air, or relative wind, is admitted through bores 5, the spring 22 expands, throwing the piston 18 to the rear and expelling the air from compression chamber C through jet 13. When the piston moves in forward direction and compresses spring 22, make-up air is drawn into compression chamber C through check valve 15.

The principle of reaction propulsion on which my invention is based, is the production of pressure differences by gas or air under pressure issuing from a nozzle, which differences become active as thrust forces. It is known from the theory of aviation that such differences of pressure acting on a surface, may be very efficient. Thus, in a flying airplane, the pressure of the ambient air is reduced above, and increased below, the wings of the plane. The higher pressure acting on the wings in vertical direction from below, produces the lift of the plane. By the reaction apparatus according to my invention, such pressure differences may be produced in horizontal direction, and high speeds attained, as only the aerodynamic resistance has to be overcome. Reaction propulsion, as mentioned, is entirely practicable in aircraft, but has failed on account of its low efficiency.

I obtain high efficiency by utilizing the vacuum the stream from jet 13 produces, and, by providing a set of nozzles as described, the pressure in the individual compartments defined by the nozzles is progressively reduced, the partial vacuum in each nozzle intensifying the partial vacuum in the other nozzle in whose outlet pipe the outlet pipe of the first-mentioned nozzle is nested, and the partial vacuum produced may become almost equal to the absolute vacuum, as mentioned above.

This mode of operation is quite novel and very efficient.

The only losses occurring in my apparatus are the friction losses in the jet, the nozzles and the compressor cylinder which may be estimated as 5%, and 95% of the available energy are utilized, as against the helical propeller in which the major portion of the energy is wasted.

My invention revolutionizes the art of producing thrust for propulsion, and opens quite novel aspects in the development of airplanes. My novel apparatus is extremely simple as against the usual power plant of an airplane, is absolutely reliable and gives maximum efficiency, so that the highest speeds are attainable therewith.

The paramount importance of my invention will be fully realized if it is considered that in my apparatus the relative wind is utilized very extensively for producing thrust force, which is impossible in a helical propeller as the circular area swept by its blades presents an extra resistance surface.

As the velocity increases, the relative wind and the volume of air admitted to the compression chamber C increase also, and it follows that the compression in the apparatus, and the thrust, increase with the velocity of the airplane or airship. Relative wind increases with the square of the velocity while reaction is directly proportional to velocity. There is a limit at which relative wind becomes equal to reaction, but this limit is a velocity much higher than the velocities attainable in propeller-driven aircraft.

Apparatus according to my invention are arranged at as many points of the aircraft, for instance, on the fuselage and the wings of an airplane, as may be required for eliminating one-sided stress on the parts, and for uniformly distributing the thrust forces. By regulating the individual apparatus, the production of reaction forces is adapted to existing flying conditions at any time.

In particular, my invention is very favorable for starting and landing, as, by turning the apparatus into vertical position, vertical forces are produced for lifting the airplane from the ground, and for decelerating its descent when landing. The lift is independent of the suction at the upper faces of the wings, and the necessity of providing long runs for starting and landing is eliminated.

My apparatus is first and foremost designed for the propulsion of aircraft but, as mentioned, it may also be used for propelling road vehicles and ships, and for the operation of compressors and similar machines.

Referring now to Figs. 5 to 8, the casing 1, with the rear nozzle 2, the subsidiary nozzles 26 to 29, to which a fifth subsidiary nozzle 30, with outlet pipe 300, has been added, are arranged in the manner described with reference to Figs. 1 to 4, and the outlet pipes of the nozzles are nested, as also described. In this type, however, the compressor cylinder is arranged in axial alignment to the casing 1 to whose front end it is secured by a flange 31, and the casing 1 and cylinder 3 are surrounded by a vacuum jacket 32.

The rear cover 12 is not placed on, but inserted in, the cylinder 3 ahead of flange 31, and cupped at its centre for the reception of jet 13. A piston valve 33 is mounted to slide with its boss on a cylindrical portion of the jet 13, and provided with a row of ports 34. The piston valve 33 is forced against an inwardly projecting rim of flange 31 by a spring 36 and in this position of the piston valve, its ports 34 register with ports 35 in the wall of the cylinder which connect the body of the first subsidiary nozzle 26 to the vacuum jacket 32 through ports 34. The front end of spring 36 is supported by the rear cover 12. Ports 37 connect the space between the piston valve 33 and the vacuum jacket 32.

The piston 18, with its web 19, but only with the ports 20 and 66, is provided as described for controlling the groove 8 to which the driving fluid supply pipes 9 and 10 are connected, and the ports 6 for admitting relative wind through bores 5.

In this type, however, the piston 18 is only the principal piston of a piston unit comprising, in addition to the principal piston 18, three auxiliary pistons 51, 52 and 53 which, together with piston 18, are secured on a tubular piston rod 38. The front end of piston rod 38 which is larger than its rear end so that the rod tapers like a nozzle, is equipped with a flange 39 bearing on the rear end of spring 22 whose front end is supported by an annular flange 40 at the front end of cylinder 3. A tube 41 extends to the rear from flange 40 and an extension 42 of the piston rod 38 is fitted to slide in the rear end of the tube.

In this type, make-up air is drawn in through the tubular piston rod 38. A cylinder 43 which is open at both ends, is inserted in the tube 41 and spaced therefrom to form an annular air-inlet passage 44. A transverse rib 45 closes the passage 44 at the rear and holds the cylinder in the tube. A piston 46 is mounted to slide in the cylinder 43, and is forced against a check at the rear end of the cylinder by a spring 47. In this position of the piston, ports 49 in the piston register with ports 50 in the cylinder 43 so that the air, or relative wind, is admitted to the interior of piston rod 38 through passage 44, ports 49, 50 and the open rear end of the cylinder 43.

Three auxiliary pistons 51, 52 and 53 are secured on the hollow piston rod 38. At the rear of every auxiliary piston, a partition 56, 56a, and 56b, respectively, is arranged and secured in the cylinder 3 at its outer perimeter. The partitions are cupped toward their centres so as to resemble nozzles, and their rear ends make a tight fit on cylindrical portions of the piston rod 38. Ports 57, 57a and 57b are formed in the piston rod 38 at the rear of each auxiliary piston. The front end of the cylinder is closed by a partition or annular cover 58 which resembles the partitions 56 etc. The skirts of the auxiliary pistons have ports 54, 62 and 63, respectively, for cooperation with ports 55, 59 and 60 which are connected to the bores 5.

The partition 58 and the first auxiliary piston 51 define together the first suction chamber Sa, and the piston 51 and the partition 56 define together the first compression chamber Ca. Similarly piston 52 and partition 56 define the second suction chamber Sb, and piston 52 and partition 56a define the second compression chamber Cb. The third suction chamber Sc is defined by 56a and piston 53. The third compression chamber Cc is defined by piston 53 and partition 56b. The fourth suction chamber Sd is defined by partition 56b and principal piston 18, with its web 19, and the fourth compression chamber Cd is defined by the web 19 of piston 18 and by the rear cover 12 in which jet 13 is inserted.

Ports 7a connect the first suction chamber Sa to the vacuum jacket 32, and ports 7b, 7c and 7d similarly connect the other suction chambers.

The operation of this apparatus is as follows:

In the initial position illustrated in Fig. 5, the piston valve 33, through ports 34 and 35, connects the body of the first subsidiary nozzle 26 the vacuum jacket 32, ports 20 connect the groove 8 to the last compression chamber Cd, and the ports 7a etc. are exposed by the skirts of the respective auxiliary pistons, and the skirt of principal piston 18, for connecting the suction chambers Sa etc. to the vacuum jacket 32. Piston 46 in cylinder 43 admits air to the interior of piston rod 38 which is connected to compression chambers Ca to Cc by the ports 57, 57a, etc. in the piston rod, and to compression chamber Cd by the open rear end of piston rod 38. The ports 55 etc. for admitting air to the suction chambers, are closed by the skirts of the respective pistons.

The compressed air from pipes 9 and 10 starts the apparatus, as described with reference to Figs. 1 to 4. The stream issuing from jet 13 produces a partial vacuum which is transferred to the vacuum jacket 32 through ports 34, 35 in piston valve 33. The jacket is connected to the space between piston valve 33 and cover 12 by ports 37, and to the individual suction chambers Sa etc. through ports 7a etc. The pressure in compression chamber Cd which is partly transferred to the other compression chambers Ca to Cc through ports 57 etc., throws the pistons toward their foremost position, while spring 22 is compressed. The forward or suction movement of the pistons closes groove 8 and interrupts the supply of compressed air to compression chamber Cd. The air under pressure flows out from the several compression chambers through jet 13. When the stream from jet 13 ceases to flow, the piston valve 33 disconnects the ports 34 and 35. While the pistons move in forward direction, air or relative wind is admitted to the individual compression chambers through passage 44 and the hollow piston rod 38. Ports 7a etc. are closed by the skirts of the respective pistons, and the partial vacuum still present in the suction chambers Sa etc. moves the pistons into their foremost position in which their skirts expose the ports 55 etc. so that air or relative wind from bores 5 is admitted to the suction chambers and the partial vacuum therein is broken. Spring 22 is now free to expand and throws the pistons to the rear, compressing the air in the compression chambers. The compressed air is ejected through jet 13, and reacting on piston 46, causes it to close the air-inlet ports 50. Finally, the parts return into their initial positions shown in Fig. 5, and are ready for the next cycle.

By the combination of pistons and nozzles in series, as described, the kinetic energy of the stream issuing from jet 13 is utilized for compressing the fluid in the apparatus and the loss of the system is reduced to a minimum.

Equalization of the vacuum in the nozzles with atmospheric pressure cannot occur, as the individual impulses of the stream from jet 13 occur so rapidly that the action of the intermittent stream is practically equal to that of a continuous one, and return flow of air is prevented.

Referring now to Figs. 9 to 13, the casing 1 with its nozzles is designed exactly as described with reference to Figs. 5 to 8, apart from the fact that it has six subsidiary nozzles instead of five, as in Figs. 5 to 8. Obviously, the number of the nozzles as well as that of the suction and compression chambers, may be varied as desired in any type of my apparatus.

The cylinder 3 is connected to the front end of casing 1 by flanges 31, and the cylinder and casing are surrounded by the vacuum jacket 32, as in the second type. The rear cover 12, the jet 13, and the piston valve 33, are also designed as in that type.

A tapered cowl 64 is placed on the cylinder 3 at the rear of ports 61 and a sleeve 80, with three rows of ports 81, 82 and 83, is secured to the wider front end of cowl 64 at 77. The sleeve surrounds the front end of cylinder 3 in spaced relation and at its own front end supports a cover 79 by flanges 78. The piston 18 by which starting air from pipes 9 and 10 is controlled, is mounted in an extra cylinder 64' on the cover 79. The rod of piston 18 is a solid member 65 and surrounded by spring 22 whose front end is inserted in a socket at the centre of cover 79 while its rear end bears against the first piston 67 of the set on rod 65. The set includes four pistons, 67, 68, 69 and 70 which are not "auxiliary" pistons as they do not cooperate with a principal piston, the piston 18 being arranged at the opposite end of cylinder 3. The pistons are annular members, each with a tubular boss 71, 72, 73 and 74, respectively which are spaced from the piston rod 65 and connected to it by spiders 75. The pistons, with partitions 76, 77 and 78 in the cylinder 3, define the suction chambers Sa to Sd, and the compression chambers Ca to Cd. The tubular bosses of the pistons make a sliding fit in the partitions. Ports 55, 59, 60 and 61 connect the interior of cylinder 3 to the interior of cowl 64.

A rotary valve 84, with three rows of ports 85, 86 and 87 in line with rows 81, 82 and 83 of the sleeve 80, is inserted in the sleeve and, with its web 88, is mounted for rotation in antifriction bearings 92 and 93. The bearing 92 which is in front of the web 88, is supported by a spring 91 on the cover 79, and the rear bearing 93 is secured to a flange 90 at the front end of cylinder 3. A cam 94, with camming members 95 and 96 at opposite ends, is placed on the tubular boss 71 of the first piston 67 so as to rotate thereon, and is equipped with a flange 97 for engaging the web 88 of rotary valve 84. A pin 98 is arranged at the rear, and a pin 99 is arranged in front, of the cam 94.

The cylinder 64' of the starting piston 18 has a row of ports 100 which open into a tube 102 surrounding the cylinder. This tube is connected to the chamber of the rotary valve 48 by ports 103 in the cover 79.

In the initial position illustrated in Fig. 9, the ports 20 of piston 18 are in line with the groove 8, as described. When driving fluid is admitted, the piston 18 moves in forward direction and pulls the set of pistons 67 etc. in the same direction. Spring 22 is compressed. The valve 84 is so positioned that its ports 85 register with the ports 81 of the sleeve 80, and its ports 87 with the ports 88 of the sleeve, while ports 86 and 82 are out of register. The forward movement of the set of pistons increases the volume of compression chambers Ca to Cd, and air, or relative wind, is admitted to, and drawn into, the chambers through ports 81, 85 and the tubular bosses of the individual pistons. The suction chambers Sa to Sd are connected to the vacuum jacket 32 through ports 55 etc., and ports 83, 87 of the sleeve and the rotary valve. The air from the suction chambers is evacuated through ports 55 etc. and into jacket 32, and the accelerating movement of piston 18 is assisted by such evacuation. The ports 34 of piston valve 33, and 36 of cylinder 3, are out of register so that the vacuum in jacket 32 is not transferred to the first subsidiary nozzle 26.

Shortly before the pistons arrive at the foremost end of their stroke, the rear edge of piston 18 exposes ports 100 so that the air from cylinder 64' flows into the compression chambers through tube 102 and ports 103. At the same time, the pin 98 on boss 71 of pistons 67 engages the camming member 95a and turns the rotary valve 84 to close ports 81 and 83, and to open ports 82 of sleeve 80. Overthrowing of the valve 84 is prevented by the vertical edge 95b of the subsequent camming member 95. Air or relative wind is now admitted to the suction chambers Sa etc. through ports 55 etc. and spring 22 now throws the pistons to the rear, compressing the air in the compression chambers Ca etc., and ejecting it through jet 13 as described. Shortly before the pistons arrive at the rear end of their stroke, the rotary valve 84 is reversed by pin 99 engaging a camming face 96a on one of the camming members 96. The apparatus is now ready for the next cycle.

It will appear that the hollow bosses 71 etc. of the pistons 67 etc. make up a passage for the air admitted to the compression chambers Ca etc., which passage opens into the jet 12. Any suitable means may be provided for connecting the bosses to the piston rod, for instance, steel ribs, not shown. Obviously such means must not interfere with the flow of the air in the tubular bosses.

By the means described, the streams and forces established in the apparatus, i. e., the partial vacuum and the relative wind produced by the stream from jet 13 and by the velocity of the aircraft, respectively, are controlled and utilized for producing thrust. The rotary valve 84 is rotated uniformly and its operation is absolutely reliable, as the stress on the members of this simple valve gear is quite negligible as compared with the usual valve gears of internal combustion engines. A particular drawback of such valve gears is that considerable masses must be speeded up during a very short period. This is why the usual valve gears are limited to speeds of the order of about 4000 revolutions per min.; much higher speeds can be attained with the rotary valve according to my invention. The velocity imparted to aircraft is limited only by the equalization of the reaction produced in my apparatus, and of relative wind, as explained above, and this limit is much higher than the normal speeds of airplanes and airships.

I claim:

1. In a fluid-reaction propelling apparatus, a compressor, a member which subdivides said compressor into a suction and a compression chamber and is movable under the influence of the pressures acting on opposite sides of the member, a jet connected to said compression chamber for discharging a stream of fluid therefrom, a nozzle which is so arranged with respect to the jet that the stream produces a partial vacuum in the nozzle, and means operatively connected to said member so as, by movement of said member, to alternately connect said compression chamber to a supply of fluid under pressure and to cut off the connection, to connect said suction chamber to the partial vacuum in said nozzle when the connection is established, and to connect said suction chamber to the ambient air when the connection is cut off.

2. In a fluid-reaction propelling apparatus, a compressor, a member which subdivides said compressor into a suction and a compression chamber and is movable under the influence of the pressure acting on opposite sides of the member, a jet connected to said compression chamber for discharging a stream of fluid therefrom, a principal nozzle at the rear end of the apparatus, an outlet pipe on said nozzle arranged co-axially to said jet for conducting the stream into the open air so that it produces a partial vacuum in the principal nozzle, a set of subsidiary nozzles arranged between said principal nozzle and said jet, an outlet pipe on each nozzle arranged co-axially to said jet and to the outlet pipe of the principal nozzle, the outlet pipes of the nozzles being so nested with respect to each other and to said jet, that the partial vacuum is gradually increased from said principal nozzle to the first subsidiary nozzle, and means operatively connected to said movable member so as, by movement of said member, to alternately connect said compression chamber to a supply of fluid under pressure and to cut off the connection, to connect said suction chamber to the partial vacuum in said first subsidiary nozzle when the connection is established, and to connect said suction chamber to the ambient air when the connection is cut off.

3. In a fluid-reaction propelling apparatus, a compressor, a member which subdivides said compressor into a suction and a compression chamber and is movable under the influence of the pressures acting on opposite sides of the member, a jet connected to said compression chamber for discharging a stream of fluid therefrom, a principal nozzle at the rear end of the apparatus, an outlet pipe on said nozzle arranged co-axially to said jet for conducting the stream into the open air so that it produces a partial vacuum in the principal nozzle, a set of subsidiary nozzles arranged between said principal nozzle and said jet, an outlet pipe on each nozzle arranged co-axially to said jet and to the outlet pipe of the principal nozzle, the outlet pipe of the principal nozzle having the largest, and the outlet pipe of the first subsidiary nozzle having the smallest diameter, and the diameters of the intermediate nozzles having intermediate values; and the outlet pipes of the nozzles being so nested with respect to each other and to said jet, that the vacuum is gradually increased from said principal nozzle to the first subsidiary nozzle, and means operatively connected to said movable member so as, by movement of said member, to alternately connect said compression chamber to a supply of fluid under pressure and to cut off the connection, to connect said suction chamber to the partial vacuum in the first subsidiary nozzle when the connection is established, and to connect said suction chamber to the ambient air when the connection is cut off.

4. In a fluid-reaction propelling apparatus, a compressor, a member which subdivides said compressor into a suction and a compression chamber and is movable under the influence of the pressures acting on opposite sides of the member, a jet connected to said compression chamber for discharging a stream of fluid therefrom, a principal nozzle at the rear end of the apparatus, an outlet pipe on said nozzle arranged co-axially to said jet for conducting the stream into the open air so that it produces a partial vacuum in the principal nozzle, a set of subsidiary nozzles arranged between said principal nozzle and said jet, an outlet pipe on each nozzle arranged co-axially to said jet and to the outlet pipe of the principal nozzle, the outlet pipe of the principal nozzle having the largest, and the outlet pipe of the first subsidiary nozzle having the smallest diameter, and the diameters of the intermediate nozzles having intermediate values; and the outlet pipes of the nozzles being so nested with respect to each other and to said jet, that the vacuum is gradually increased from said principal nozzle to the first subsidiary nozzle, the number of said subsidiary nozzles, the ratio of the diameters of their outlet pipes, and the volumes of the compartments defined by the nozzles, being determined by the degree of expansion of the stream, and by the ratio of the free sectional areas of said outlet pipes; and means operatively connected to said movable member so as, by movement of said member, to alternately connect said compression chamber to a supply of fluid under pressure and to cut off the connection, to connect said suction chamber to the partial vacuum in the first subsidiary nozzle when the connection is established, and to connect said suction chamber to the ambient air when the connection is cut off.

5. In a fluid-reaction propelling apparatus, a compressor, a member which subdivides said compressor into a suction and a compression chamber and is movable under the influence of the pressures acting on opposite sides of the member, a jet connected to said compression chamber for discharging a stream of fluid therefrom, a principal nozzle at the rear end of the apparatus, an outlet pipe on said nozzle arranged co-axially to said jet for conducting the stream into the open air so that it produces a partial vacuum in the principal nozzle, a set of subsidiary nozzles, each with a curved and funnel-shaped body, a tapered outlet pipe on each nozzle arranged co-axially to said jet and to the outlet pipe of the principal nozzle, the outlet pipes of the nozzles being so nested with respect to each other and to said jet, that the vacuum is gradually increased from said principal nozzle to the first subsidiary nozzle, and means operatively connected to said movable member so as, by movement of said member, to alternately connect said compression chamber to a supply of fluid under pressure and to cut off the connection, to connect said suction chamber to the partial vacuum in the first subsidiary nozzle when the connection is established, and to connect said suction chamber to the ambient air when the connection is cut off.

6. In a fluid-reaction propelling apparatus, a casing, a compressor in said casing, a member which subdivides said compressor into a suction and a compression chamber and is movable under the influence of the pressures acting on opposite sides of the member, a jet also arranged in said casing and connected to said compression chamber for discharging a stream of fluid from the compression chamber, a principal nozzle at the rear end of said casing, a tapered outlet pipe on said nozzle arranged co-axially to said jet for conducting the stream into the open air so that it produces a partial vacuum in the principal nozzle, a set of subsidiary nozzles, each with a curved and funnel-shaped body, arranged between said principal nozzle and said jet, with their bodies secured to said casing on the inner side thereof, a tapered outlet pipe on each nozzle arranged co-axially to said jet and to the outlet pipe of the principal nozzle, the outlet pipes of the nozzles being so nested with respect to each other and to said jet, that the vacuum is gradually increased from said principal nozzle to the first subsidiary nozzle, and means operatively connected to said movable member so as, by movement of said member, to alternately connect said compression chamber to a supply of fluid under pressure and to cut off the connection, to connect said suction chamber to the partial vacuum in the first subsidiary nozzle when the connection is established, and to connect said suction chamber to the ambient air when the connection is cut off.

7. In a fluid-reaction propelling apparatus, a compressor, a member which subdivides said compressor into a suction and a compression chamber and is movable under the influence of the pressures acting on opposite sides of the member, a jet connected to said compression chamber for discharging a stream of fluid therefrom, a nozzle which is so arranged with respect to the jet that the stream produces a partial vacuum in the nozzle, means operatively connected to said member so as, by movement of said member, to alternately connect said compression chamber to a supply of fluid under pressure and to cut off the connection, to connect said suction chamber to the partial vacuum in said nozzle when the connection is established, and to connect said suction chamber to the ambient air when the connection is cut off, and means, also operatively connected to said movable member, for storing energy when said member moves toward said suction chamber.

8. In a fluid-reaction propelling apparatus, a compressor cylinder, a piston which is mounted to slide in said cylinder and subdivides it into a suction and a compression chamber, and is movable under the influence of the pressures acting on opposite sides of the piston, a jet connected to said compression chamber for discharging a stream of fluid therefrom, a nozzle which is so arranged with respect to the jet that the stream produces a partial vacuum in the nozzle, means operatively connected to said piston so as, by movement of said piston, to alternately connect said compression chamber to a supply of fluid under pressure and to cut off the connection, to connect said suction chamber to the partial vacuum in said nozzle when the connection is established, and to connect said suction chamber to the ambient air when the connection is cut off; and a spring arranged in said suction chamber so as to be compressed when said piston moves toward said suction chamber.

9. In a fluid-reaction propelling apparatus, a compressor cylinder having ports, a piston which is mounted to slide in said cylinder and comprises a web subdividing said cylinder into a suction and a compression chamber, and a skirt having ports at opposite sides of said web for cooperation with the ports in the cylinder, which piston is movable under the influence of the pressures acting on opposite sides of said web, a jet connected to said compression chamber for discharging a stream of fluid therefrom, a nozzle which is so arranged with respect to the jet that the stream produces a partial vacuum in the nozzle, the ports in said cylinder and in said skirt being so arranged as, by movement of said piston, to alternately connect said compression chamber to a supply of fluid under pressure and to cut off the connection, to connect said suction chamber to the partial vacuum in said nozzle when the connection is established, and to connect said suction chamber to the ambient air when the connection is cut off; and a spring arranged in said suction chamber and abutted against said web with one of its ends, so as to be compressed when said piston moves toward said suction chamber.

10. In a fluid-reaction propelling apparatus, a compressor, a member which subdivides said compressor into a suction and a compression chamber and is movable under the influence of the pressures acting on opposite sides of the member, a jet connected to said compression chamber for discharging a stream of fluid therefrom, means for admitting make-up air to said compression chamber, a nozzle which is so arranged with respect to the jet that the stream produces a partial vacuum in the nozzle, and means operatively connected to said member so as, by movement of said member, to alternately connect said compression chamber to a supply of fluid under pressure and to cut off the connection, to connect said suction chamber to the partial vacuum in said nozzle when the connection is established, and to connect said suction chamber to the ambient air when the connection is cut off.

11. In a fluid-reaction propelling apparatus, a compressor cylinder, a piston which is mounted to slide in said cylinder and subdivide it into a suction and a compression chamber, and is movable under the influence of the pressures acting on opposite sides of the piston, a jet connected to said compression chamber for discharging a stream of fluid therefrom, means for admitting make-up air to said compression chamber, a nozzle which is so arranged with respect to the jet that the stream produces a partial vacuum in the nozzle, means operatively connected to said piston so as, by movement of said piston, to alternately connect said compression chamber to a supply of fluid under pressure and to cut off the connection, to connect said suction chamber to the partial vacuum in said nozzle when the connection is established, and to connect said suction chamber to the ambient air when the connection is cut off; and a spring arranged in said suction chamber so as to be compressed when said piston moves toward said suction chamber.

12. In a fluid-reaction propelling apparatus, a compressor cylinder, a piston rod in said cylinder, a set of pistons secured to said rod and mounted to slide in said cylinder, a set of partitions subdividing said cylinder into a plurality of suction and compression chambers together with said pistons, a jet connected to all said compression chambers for discharging a stream of fluid therefrom, nozzles which are so arranged with respect to the jet that the stream produces a partial vacuum in the nozzles, means operatively connected to said pistons so as, by movement of said pistons, to alternately connect one of said compression chambers to a supply of fluid under pressure and to cut off the connection, to connect all said suction chambers to the partial vacuum in said nozzles when the connection is established, and to connect all said suction chambers to the ambient air when the connection is cut off; and means, also operatively connected to said pistons, for storing energy when each piston moves toward its suction chamber.

13. In a fluid-reaction propelling apparatus, a compressor cylinder, a hollow piston rod in said cylinder, a set of pistons secured to said rod and mounted to slide in said cylinder, a set of partitions subdividing said cylinder into a plurality of suction and compression chambers together with said pistons, said compression chambers being permanently connected to the interior of said hollow piston rod, means controlled by the pressure in said rod for admitting make-up air to said compression chambers, a jet connected to all said compression chambers for discharging a stream of fluid therefrom, nozzles which are so arranged with respect to the jet that the stream produces a partial vacuum in the nozzles, means operatively connected to said pistons so as, by movement of said pistons, to alternately connect one of said compression chambers to a supply of fluid under pressure and to cut off the connection, to connect all said suction chambers to the ambient air when the connection is cut off; and means, also operatively connected to said pistons, for storing energy when each piston moves toward its suction chamber.

14. In a fluid-reaction propelling apparatus, a compressor cylinder, a set of pistons mounted to slide in said cylinder, a tubular boss on each piston which is secured to, and spaced from, said piston rod, a set of partitions subdividing said cylinder into a plurality of suction and compression chambers together with said pistons, each tubular boss making a sliding fit in the corresponding partition, a jet connected to all said compression chambers for discharging a stream of fluid therefrom, nozzles which are so arranged with respect to the jet that the stream produces a partial vacuum in the nozzles, means operatively connected to said pistons so as, by movement of said pistons, to alternately admit fluid under pressure to said compression chambers through said hollow bosses and to cut off the connection, to connect all said suction chambers to the partial vacuum in said nozzles when the connection is established, and to connect all said suction chambers to the ambient air when the connection is cut off; and means, also operatively connected to said pistons, for storing energy when each piston moves toward its suction chamber.

15. In a fluid-reaction propelling apparatus, a compressor cylinder, a set of pistons mounted to slide in said cylinder, a tubular boss on each piston which is secured to, and spaced from, said piston rod, a set of partitions subdividing said cylinder into a plurality of suction and compression chambers together with said pistons, each tubular boss making a sliding fit in the corresponding partition, a jet connected to all said compression chambers for discharging a stream of fluid therefrom, nozzles which are so arranged with respect to the jet that the stream produces a partial vacuum in the nozzles, means operatively connected to said pistons, so as, by movement of said pistons, to alternately admit fluid under pressure to said compression chambers through said hollow bosses and to cut off the connection, means including a slotted sleeve secured to said cylinder, and a rotary valve arranged in said cylinder and operatively connected to said pistons, for connecting all said suction chambers to the partial vacuum in said nozzles when the connection is established, to connect all said suction chambers to the ambient air when the connection is cut off, and for admitting make-up air to said compression chambers; and means, also operatively connected to said pistons, for storing energy when each piston moves toward its suction chamber.

16. In a fluid-reaction propelling apparatus, a compressor cylinder, a set of pistons mounted to slide in said cylinder, a tubular boss on each piston which is secured to, and spaced from, said piston rod, a set of partitions subdividing said cylinder into a plurality of suction and compression chambers together with said pistons, each tubular boss making a sliding fit in the corresponding partition, a jet connected to all said compression chambers for discharging a stream of fluid therefrom, nozzles which are so arranged with respect to the jet that the stream produces a partial vacuum in the nozzles, means operatively connected to said pistons, so as, by movement of said pistons, to alternately admit fluid under pressure to said compression chambers through said hollow bosses and to cut off the connection, a slotted sleeve secured to said cylinder, a rotary valve arranged in said cylinder, and camming means operatively connected to said pistons for rotating said valve and connecting all said suction chambers to the partial vacuum in said nozzles when the connection is established, and to the ambient air when the connection is cut off, and for admitting make-up air to said compression chambers; and means also operatively connected to said pistons, for storing energy when each piston moves toward its suction chamber.

HANS ENDRES.